(12) United States Patent
Watanabe

(10) Patent No.: US 10,513,174 B2
(45) Date of Patent: Dec. 24, 2019

(54) VEHICLE LID DEVICE

(71) Applicant: NIFCO INC., Yokosuka-shi, Kanagawa (JP)

(72) Inventor: Yasuhiro Watanabe, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/753,078

(22) PCT Filed: Aug. 30, 2016

(86) PCT No.: PCT/JP2016/075357
§ 371 (c)(1),
(2) Date: Feb. 15, 2018

(87) PCT Pub. No.: WO2017/038833
PCT Pub. Date: Mar. 9, 2017

(65) Prior Publication Data
US 2018/0236870 A1    Aug. 23, 2018

(30) Foreign Application Priority Data
Sep. 3, 2015 (JP) ................... 2015-174030

(51) Int. Cl.
*B60K 15/05* (2006.01)
*B60K 15/04* (2006.01)

(52) U.S. Cl.
CPC .......... *B60K 15/05* (2013.01); *B60K 15/0409* (2013.01); *B60K 2015/0451* (2013.01); *B60K 2015/053* (2013.01); *B60K 2015/0553* (2013.01)

(58) Field of Classification Search
CPC ............... B60K 15/05; B60K 15/053; B60K 2015/053; B60K 2015/0515; B60K 2015/0576
USPC ........................................................ 296/97.22
See application file for complete search history.

(56) References Cited

U.S. PATENT DOCUMENTS

| 4,236,274 | A | 12/1980 | Omote et al. | |
|---|---|---|---|---|
| 5,145,081 | A * | 9/1992 | Gravino | B60K 15/05 220/86.2 |
| 5,944,218 | A | 8/1999 | Jenssen | |
| 9,682,619 | B2 * | 6/2017 | Betzen | B60K 15/05 |

(Continued)

FOREIGN PATENT DOCUMENTS

| CN | 203222043 U | 10/2013 |
|---|---|---|
| JP | S54-159625 U | 11/1979 |

(Continued)

OTHER PUBLICATIONS

PCT/ISA/210, "International Search Report for International Application No. PCT/JP2016/075357," dated Oct. 18, 2016.

(Continued)

*Primary Examiner* — Dennis H Pedder
(74) *Attorney, Agent, or Firm* — Manabu Kanesaka

(57) ABSTRACT

A vehicle lid device includes a housing provided with a fuel filling aperture portion; a lid opening and closing an opening of the housing; and a link member connecting the lid to the housing to be openable and closable. The vehicle lid device includes a base member capable of axially supporting the link member to be turnable, and a depressed portion provided in the housing and capable of receiving the base member.

5 Claims, 11 Drawing Sheets

(56) References Cited

U.S. PATENT DOCUMENTS

| | | |
|---|---|---|
| 2006/0284440 A1 | 12/2006 | Leitner |
| 2009/0309386 A1* | 12/2009 | Yamamoto ......... B60K 15/0406 |
| | | 296/97.22 |
| 2016/0263994 A1* | 9/2016 | Brown ................... B60K 15/05 |
| 2016/0280061 A1 | 9/2016 | Desai et al. |
| 2018/0236870 A1 | 8/2018 | Watanabe |

FOREIGN PATENT DOCUMENTS

| | | |
|---|---|---|
| JP | S63-4727 U | 1/1988 |
| JP | H02-124721 U | 10/1990 |
| JP | H05-63944 U | 8/1993 |
| JP | H06-13924 U | 2/1994 |
| JP | H07-329585 A | 12/1995 |
| JP | H11-189261 A | 7/1999 |
| JP | 2013-095335 A | 5/2013 |
| JP | 2005-343367 A | 12/2015 |
| JP | S466293 B2 | 2/2019 |
| KR | 20120000875 A | 1/2012 |
| WO | 2015/076898 A1 | 5/2015 |

OTHER PUBLICATIONS

Europe Patent Office, "Search Report for European Patent Application No. 16841864.8," dated May 10, 2019.

* cited by examiner

VEHICLE LID DEVICE

FIELD OF TECHNOLOGY

The present invention relates to a vehicle lid device.

BACKGROUND ART

FIGS. 11(a) and 11(b) show a fuel lid (hereinafter, called a lid) disclosed in Patent Document 1. The lid 13 opens and closes a fuel filling aperture portion 5 provided in a rear fender portion 3 of a car body rear portion shown in FIG. 11(a). The fuel filling aperture portion 5 is divided and formed by a housing, has a concave shape with front and back vertical faces 7 extending in a car width direction and right and left side faces 11 extending in a vehicle front and back direction, and has a fuel inlet portion closed by a cap at a bottom wall of the concave shape which is omitted in the drawing. The lid 13 is formed in a flange portion 21 wherein a front side bends inwardly in the car width direction, and includes a supporting bracket 19 provided along the flange portion 21 on a front reverse side. Then, the lid 13 is supported to be openable and closable through first and second link members 15 and 17 relative to an attachment bracket 9 fixed to the vertical face 7.

In that case, in the attachment bracket 9 and the supporting bracket 19, respectively, two supporting pins 27 and two supporting pins 35 are projected. In the first link member 15, both ends are formed in C-shaped supporting portions 23 and 25, and the supporting portions 23 and 25 are connected to be turnable to the supporting pin 27 of the attachment bracket and the supporting pin 27 of the supporting bracket. In the second link member 17, both ends are formed in C-shaped supporting portions 31 and 33, and the supporting portions 31 and 33 are connected to be turnable to the supporting pin 35 of the attachment bracket and the supporting pin 35 of the supporting bracket as well. Also, the second link member 17 is disposed on a backward side of the first link member 15, and supports a movement of the first link member 15 so as to regulate an opening and closing track of the lid 13 to a predetermined path.

PRIOR ART DOCUMENT

Patent Document

Patent Document 1: Japanese Unexamined Patent Application Publication No. 2005-343367

SUMMARY OF THE INVENTION

Problems to be Solved by the Invention

In the aforementioned lid structure, usually, in a state wherein the lid is assembled to the housing dividing the fuel filling aperture portion through the link members and the like, the housing is inserted to an inner side of an opening portion provided in a car body panel (an outer panel and the like), and is integrally mounted in an edge portion of the opening portion through a seal member. Then, when fuel is filled, after the lid comes to an open state, a cap of the fuel inlet portion provided inside the fuel filling aperture portion is removed, and then a fuel nozzle is inserted into the fuel inlet portion from a space of the fuel filling aperture portion. In the fueling operation, there is a possibility that the fuel nozzle abuts against the attachment bracket and the like protruding into the space of the fuel filling aperture portion accidentally. Naturally, in a lid open state, since the attachment bracket protrudes to the fuel filling aperture portion, it lacks a design property.

Incidentally, as for a measure for the above, for example, there may be provided a projecting portion projecting outwardly in a circumference portion of the housing dividing the fuel filling aperture portion, and may have a lid support portion in an inner space of the projecting portion so as to keep an appearance in the lid open state (for example, Japanese Unexamined Patent Application Publication No. 2014-97712). In that case, first, from a state wherein the projecting portion is placed on a panel back face side relative to an opening of the car body panel, the housing is mounted through the seal member while being inserted in a direction obliquely to the car body panel. However, in this operation, the housing cannot be straightly inserted into the opening of the car body panel due to the presence of the projecting portion so as to have a possibility that the seal member may be twisted or displaced.

Objects of the present invention are to solve the aforementioned problems, and to obtain a vehicle lid device wherein the housing dividing the fuel filling aperture portion, i.e., the fuel filling aperture portion into which the fuel nozzle is inserted, has an excellent design property, and does not interfere with inserting and removing operations of the fuel nozzle relative to the fuel inlet portion on a bottom wall side of the fuel filling aperture portion. Also, the lid device which has an excellent mounting operability relative to an attachment opening portion of the car body panel can be obtained as well. Other objects will be clarified in the following explanations.

Means for Solving the Problems

In order to obtain the aforementioned objects, a vehicle lid device according to a first aspect of the present invention comprises a housing provided with a fuel filling aperture portion; a lid for opening and closing an opening of the housing; and a link member for connecting the lid relative to the housing to be openable and closable, and includes a base member capable of pivotally supporting the link member to be turnable, and a concave portion provided in the housing and capable of receiving the base member.

The aforementioned vehicle lid device according to the first aspect of the present invention may be formed in aspects specified hereinafter.

(A) An aspect wherein an engaging portion is formed in either one of the base member or the concave portion, an engaged portion engaging the engaging portion is formed in the other of the base member or the concave portion, and the base member is mounted relative to the concave portion through an engagement of the engaging portion and the engaged portion. According to the aspect, an excellent assembling property can be obtained, thereby reducing the number of assembly processes as well.

(B) An aspect wherein the engaging portion and the engaged portion are formed by a projecting piece portion and a groove portion which can engage with each other. According to the aspect, the base member can be attached to the concave portion by a sliding operation in a direction along the groove portion, i.e., one-touch operation.

(C) An aspect wherein the link member is formed by a first link member and a second link member, and an urging device is disposed between the first link member and the second link member. According to the aspect, a turning track of the lid can be easily controlled in the same manner as in the Patent Document 1. Thereby, even if the base member or a shaft portion of the lid is disposed inside the housing, interference relative to the housing or a car body can be avoided. Also, an urging force of the urging device acts between each link so as to prevent wobbling of the link.

(D) An aspect wherein when the lid opens, an outer face of one of the link members approximately flush with a corresponding portion of the housing. According to the aspect, an appearance can be improved.

(E) An aspect wherein a base end of the link member is connected relative to the base member to be turnable through the shaft portion, and a shaft end of the shaft portion is shielded (becomes invisible) by an inner wall face of the concave portion. According to the aspect, in the base end of the link member, the shaft portion of the base member becomes invisible so as to improve the appearance, and a possibility of an unintentional separation can be solved.

(F) An aspect wherein the housing, the lid, the link member, and the base member are formed by a resin molded article. According to the aspect, a resin can reduce the weight.

The vehicle lid device according to a second aspect of the present invention is specified from a viewpoint of a mounting structure to a car body panel, and comprises the housing provided with the fuel filling aperture portion; the lid for opening and closing the opening of the housing; and the link member for connecting the lid relative to the housing to be openable and closable, and after integrally assembling the aforementioned three portions, a seal member is attached in a state interposed relative to an opening portion of an outer panel of a vehicle. The link member is formed by the first link member and the second link member, and the shaft portion pivotally supporting the link member to be turnable relative to the housing side is positioned on an inner side of the housing.

Effect of the Invention

In the vehicle lid device according to the first aspect of the present invention, as for the lid device including the housing, the lid, and the link member for connecting the lid to the housing, the link member is pivotally supported in the base member disposed in the concave portion of the housing so as to eliminate or reduce a protruding member or a protruding portion into the housing compared to a conventional structure, thereby providing an excellent design property of a space inside the housing, i.e., the fuel filling aperture portion, and improving an operability of inserting the fuel nozzle into a fuel inlet portion provided on a bottom wall side of the housing or pulling out the fuel nozzle.

In the vehicle lid device according to the second aspect of the present invention, after the three portions of the housing, the lid, and the link member are assembled, in an attaching operation of the three portions relative to an attachment frame mounted in an outer panel of a car body by interposing the seal member, as for the housing, a portion protruding outwardly from a circumference can be eliminated as much as possible, so that when the housing is inserted into the opening portion of the car body, the housing can be straightly inserted, thereby solving a possibility that the seal member may be twisted or displaced accompanied by the insertion.

BRIEF DESCRIPTION OF THE DRAWINGS

FIGS. 1(a) and 1(b) show a state wherein a lid device of an embodiment is mounted on a car body side, wherein FIG. 1(a) is a diagram showing a closed state of a lid, and FIG. 1(b) is a diagram showing an open state of the lid, and shows one portion of a rear fender.

FIGS. 2(a) and 2(b) are cross-sectional views corresponding to line A-A in FIG. 1(a), wherein FIG. 2(a) is a drawing showing a state before mounting to an attachment frame on a car body panel side, and FIG. 2(b) is a drawing showing a state mounted in the attachment frame.

FIGS. 4(a) to 4(e) show the lid device, wherein FIG. 4(a) is a top view, FIG. 4(b) is a left side view, FIG. 4(c) is a front view, FIG. 4(d) is a right side view, and FIG. 4(e) is a bottom view.

FIGS. 6(a) to 6(c) show a structure of the lid, wherein FIG. 6(a) is an exploded view showing the lid and a support member mounted on a reverse face of the lid, and FIGS. 6(b) and 6(c) are end views of the support member viewed from a B direction and a C direction in FIG. 6(a).

FIGS. 11(a) and 11(b) show a disclosure in Patent Document 1, wherein FIG. 11(a) is an explanatory view in a non-usage state wherein the lid device is mounted in a car body panel, and FIG. 11(b) is a cross-sectional view taken along line A-A in FIG. 11(a).

BEST MODES OF CARRYING OUT THE INVENTION

Figure 1A:
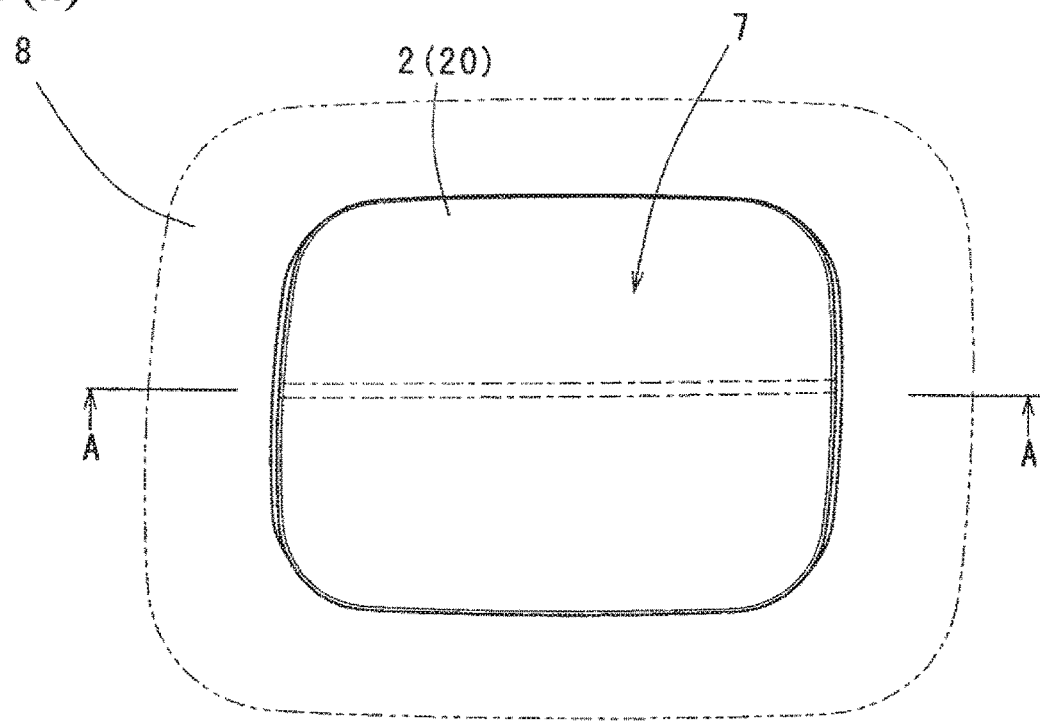
Figure 1B:
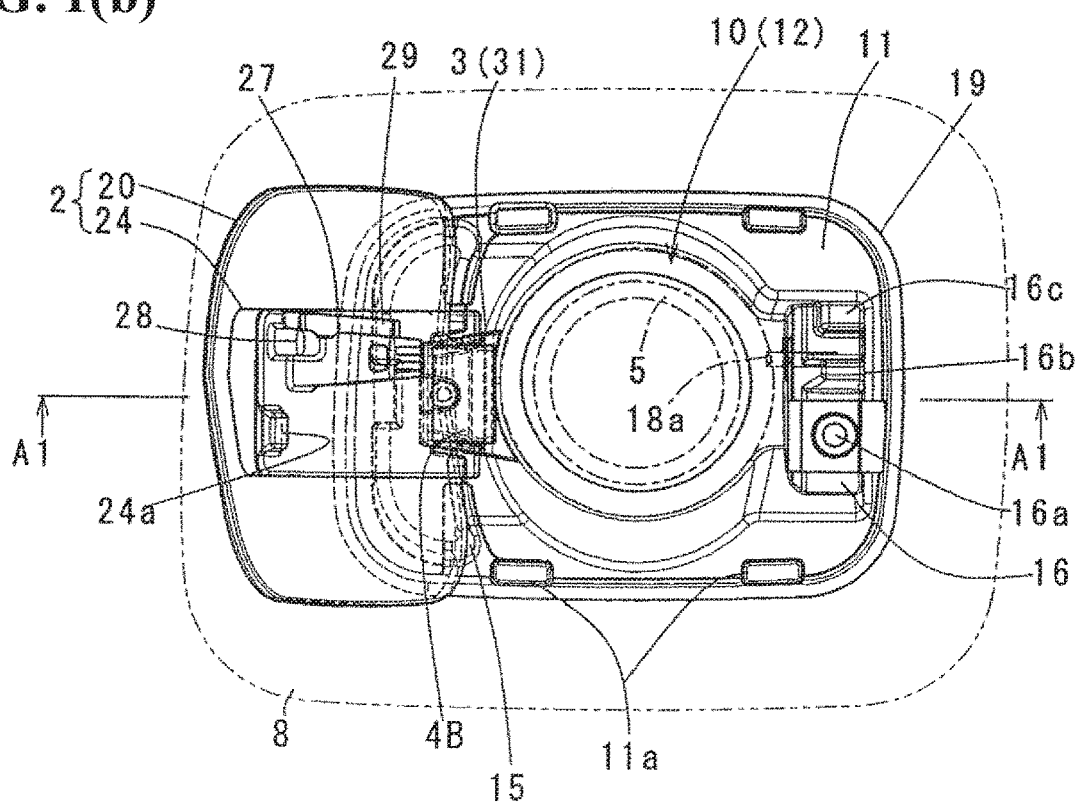

The best mode of the present invention will be explained with reference to the attached drawings. In an explanation, after a structure of a lid device according to the present invention is clarified, operation characteristics will be described.

(Structure) In FIG. 1(a) to FIG. 5, a lid device 7 comprises an approximately container-like housing 1 dividing a fuel filling aperture portion 12 and opening upwardly; a lid 2 opening and closing an upper opening of the housing 1; a base member 3 mounted in an inner circumference of the housing 1; a link member 4 supporting the lid 2 relative to the base member 3 to be openable and closable; and a cylindrical member 5 connected to a bottom wall of the housing 1 to insert a fuel nozzle from the fuel filling aperture portion 12. Also, the lid 2 is formed by a lid member 20 and a support member 24 mounted on a reverse face of the lid member. The link member 4 is formed by first and second link members 4A and 4B. Incidentally, the housing 1, the lid 2 (the lid member 20 and the support member 24), the base member 3, the link member 4 (the first link member 4A and the second link member 4B), and the cylindrical member 5 are respectively resin injection molding members.

In other words, in the lid device 7, the lid 2 is supported relative to the housing 1 to be turnable through the base member 3 and two link members 4A and 4B. Then, the lid 2 is locked in a closed state in FIGS. 2(a) and 2(b) by a lock device 18 mounted on an outer circumference of the housing 1, and, for example, when the lock device 18 is operated to release the locking through an opener inside a vehicle compartment, or the locking is released by an association with a release operation of a door lock, the lid 2 slightly opens from the closed state in FIGS. 2(a) and 2(b) against an urging force of an urging device (torsion spring) 6 by the later-described push lifter 6a. Then, in a middle of turning the lid 2 in an opening direction by hand, an urging direction of the urging device 6 is reversed, and after that, the lid 2 turns in a fully opening direction by the urging force of the urging device 6. Hereinafter, the details will be clarified.

Figure 4A:
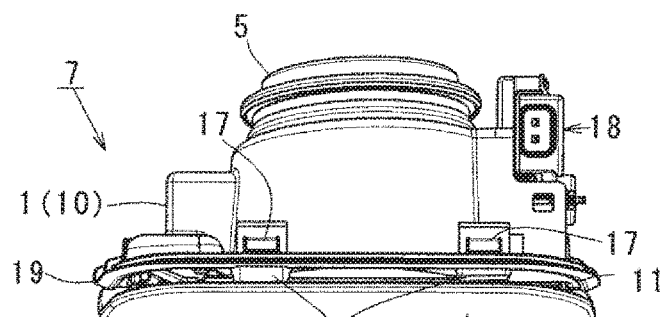
Figure 4B:
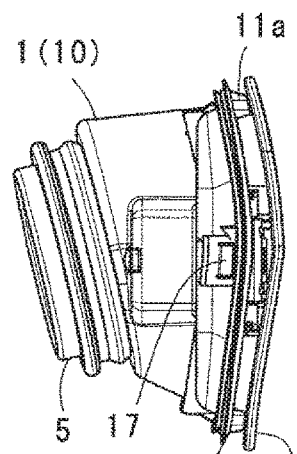
Figure 4C:
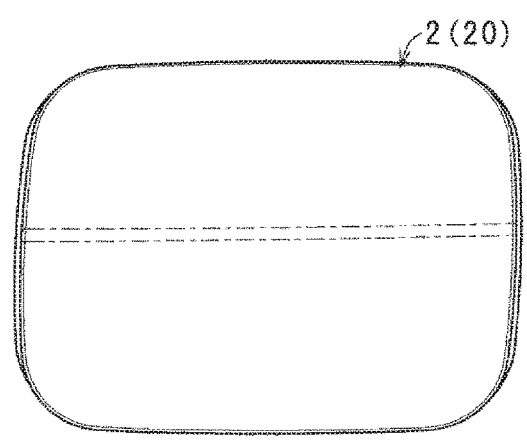
Figure 4D:
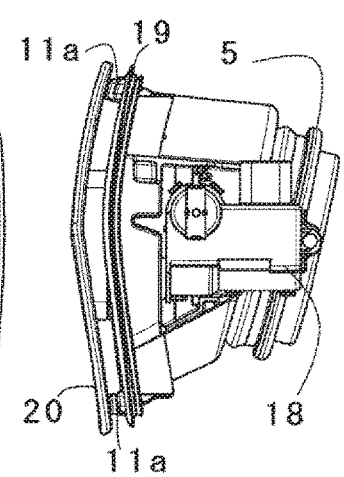
Figure 4E:
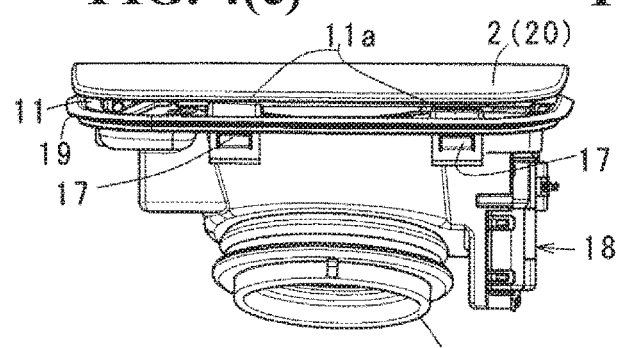
Figure 5:
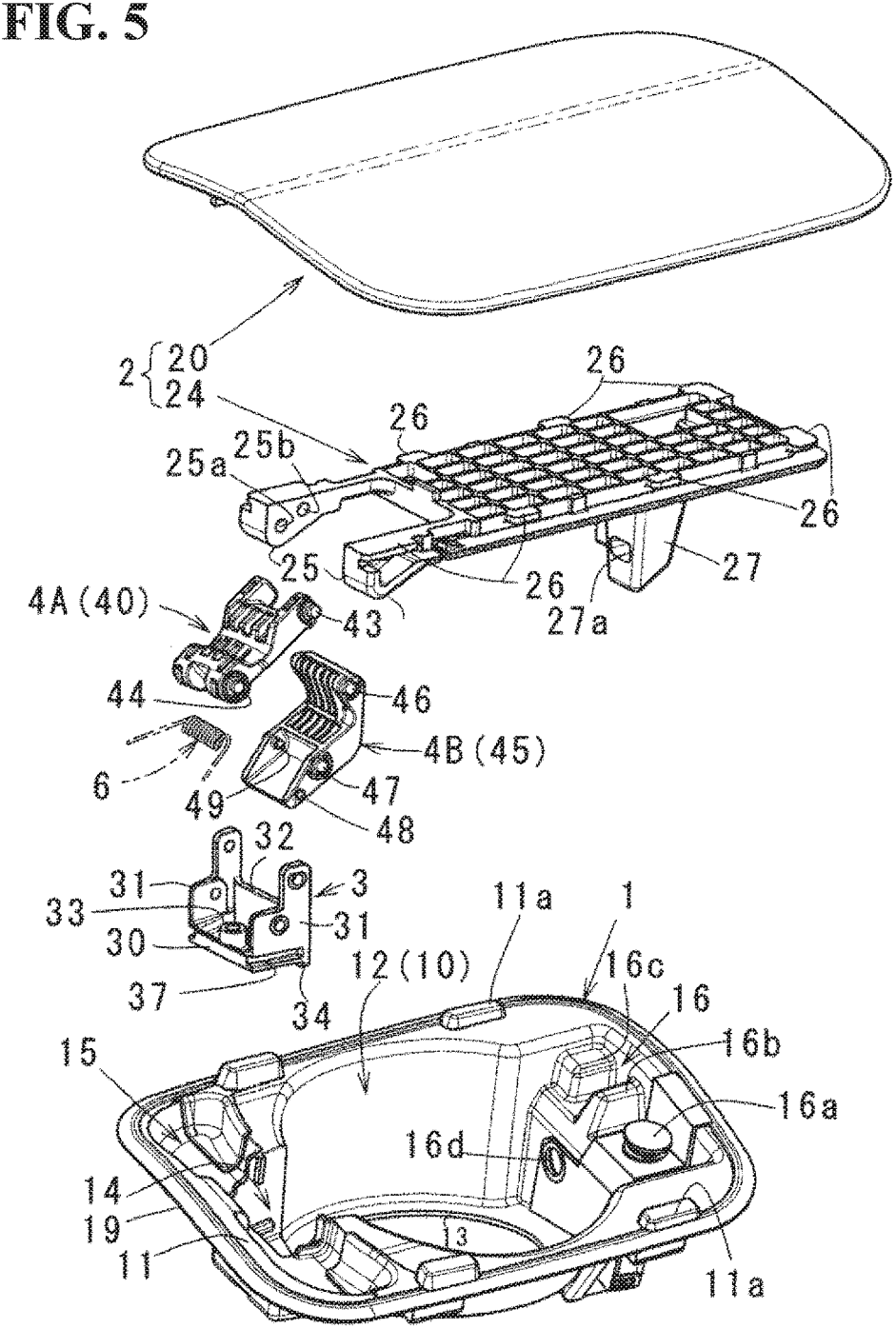
FIG. 5 is a schematic exploded view showing a structure of the lid device.

As shown in FIG. 5, in the housing 1, a flange portion 11 protrudes on an upper circumference of a cylindrical portion 10. The cylindrical portion 10 comprises a circular through hole 13 provided at the bottom wall; a concave portion 14 provided in the inner circumference and having a size which can receive the base member 3; a cavity portion 15 wherein a right to left or front to back portion of the concave portion 14 is formed lower by one step; a cavity portion 16 located in the inner circumference, positioned in a portion facing the concave portion 14, and formed lower by step; a plurality of elastic locking claws 17 projected on the outer circumference; and the lock device 18 locking the lid 2 in the closed state (see FIGS. 2(a) and 2(b)). Also, the flange portion 11 has an approximately rectangular shape, and as shown in enlarged views in FIGS. 2(a) and 2(b), includes a seal member 19 integrally mounted in a tip circumference portion. The symbol 11a shown in FIGS. 4(a), 4(b), 4(d), and 4(e) represents a plurality of projections provided on the flange portion 11 for receiving the lid 2.

Among those, the cylindrical member 5 is connected to the through hole 13 (see FIG. 5). The cylindrical member 5 communicates with a fuel tank side which is not shown in the drawings by a connecting pipe. Then, a fuel nozzle for fueling is carried out with a fueling operation in a state wherein the fuel nozzle for fueling is inserted into a cylinder of the cylindrical member 5 from the fuel filling aperture portion 12.

Figure 8A:
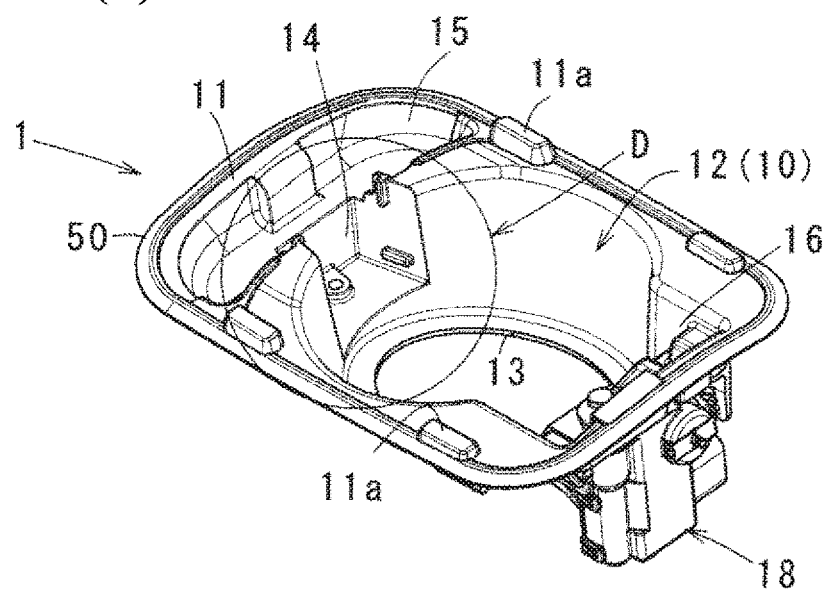
FIG. 8(a) is a perspective view showing a state wherein a lock device is mounted in the housing.

As shown in FIG. 8(a), a top portion of the concave portion 14 communicates with the cavity portion 15, and the concave portion 14 includes projecting piece portions 14a which are engaging portions respectively provided on facing inside surfaces and horizontally protruding; control projections 14b protruding up and down and positioning the base member 3; and a pedestal 14c protruding from a bottom face on a back side and having a through hole. The projecting piece portions 14a engage groove portions 37 provided on both side portions 31 of the later-described base member 3 so as to allow the base member 3 to be mounted in the concave portion 14.

Figure 2A:
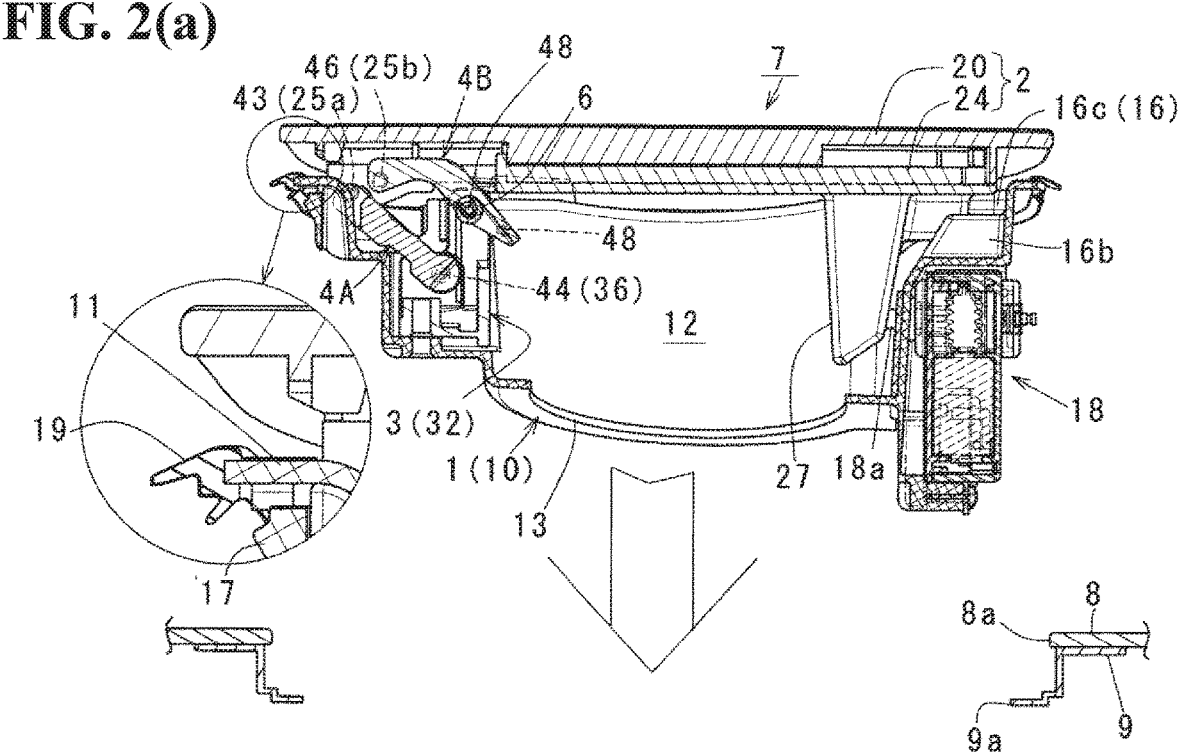
Figure 2B:
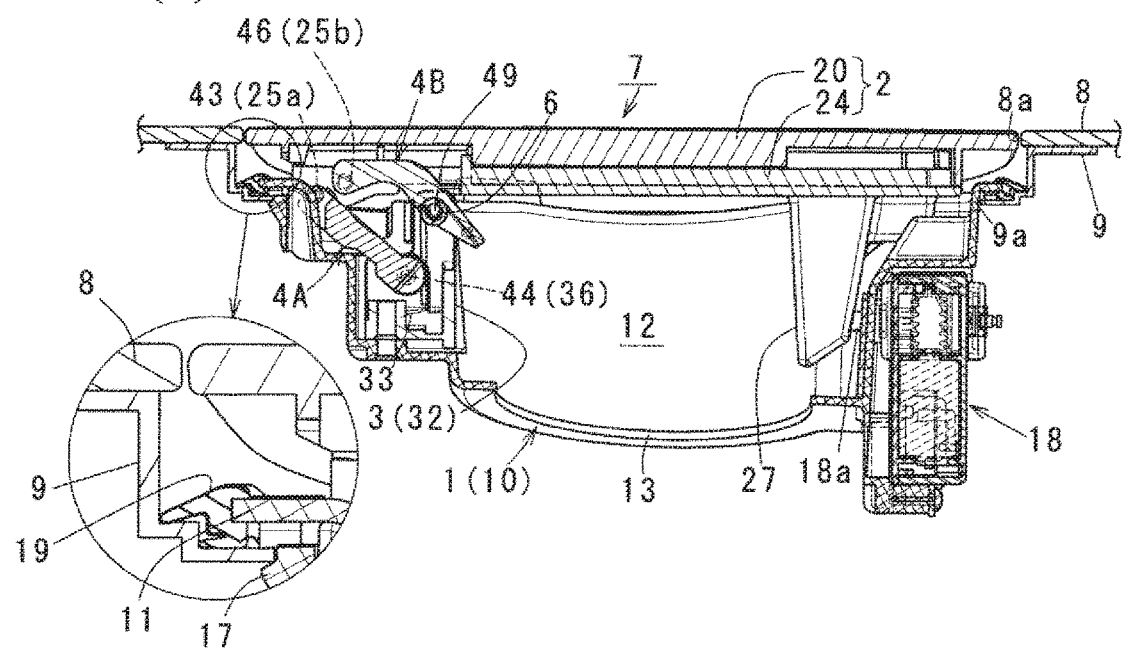
Figure 3:
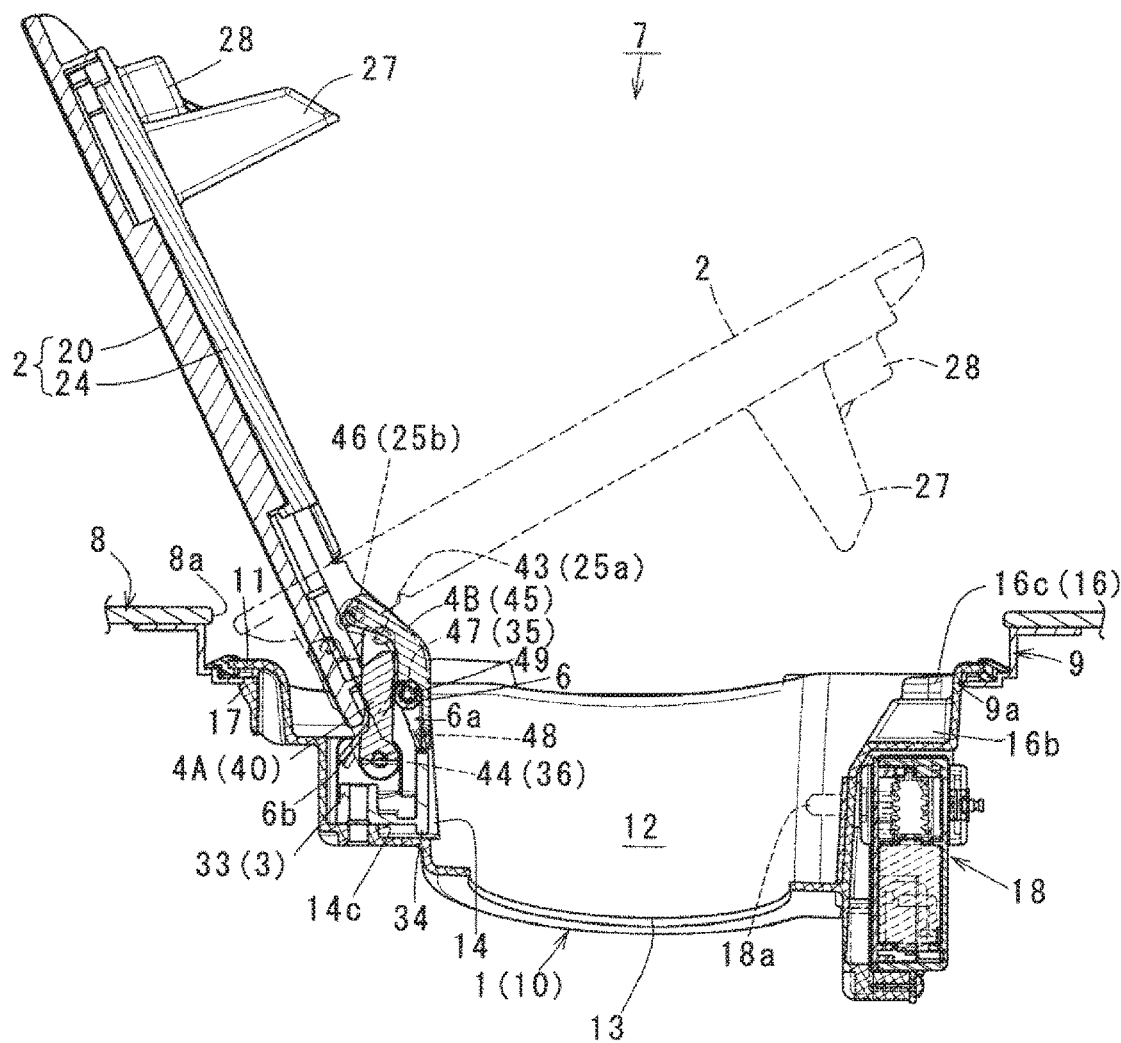
FIG. 3 is a cross-sectional view corresponding to line A1-A1 in FIG. 1(b).
Figure 7A:
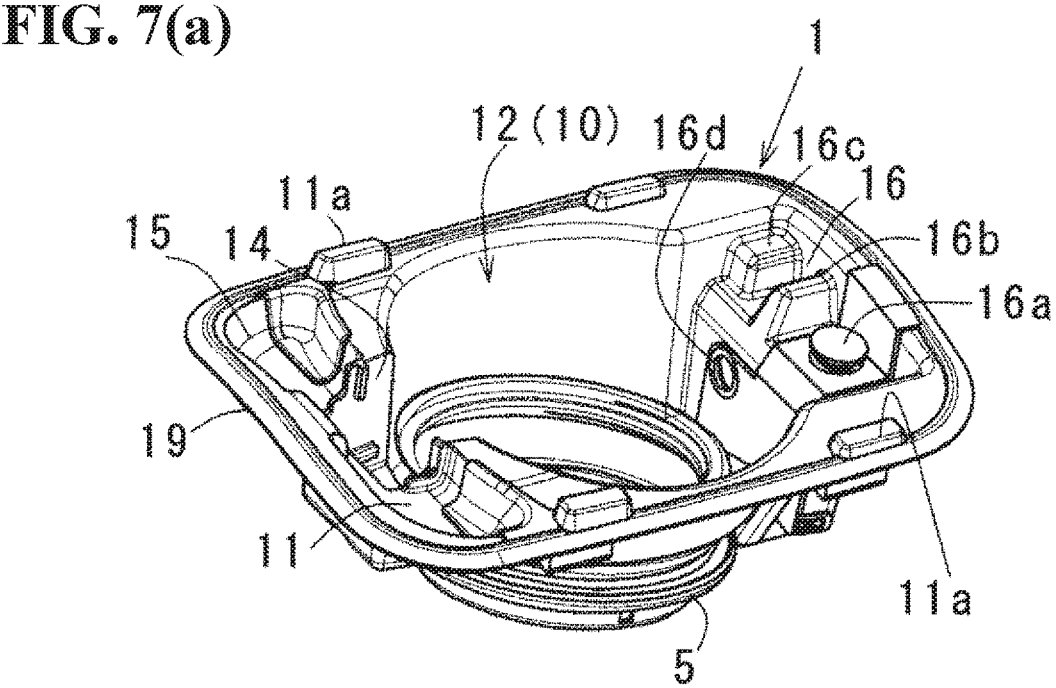
FIG. 7(a) is a perspective view showing a state wherein a cylinder member is mounted in a housing.
Figure 7B:
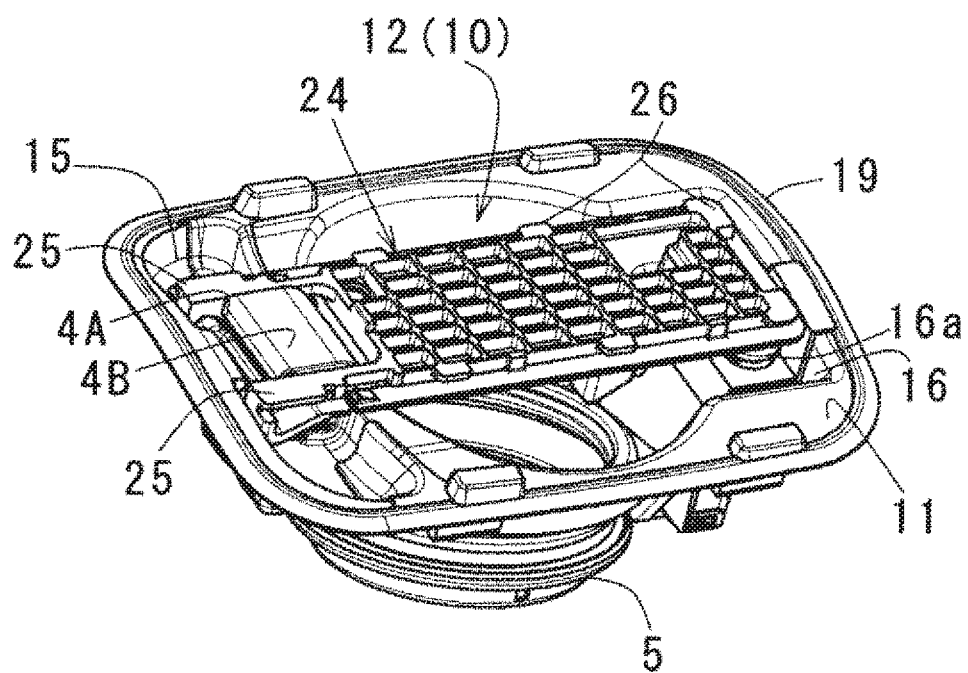
FIG. 7(b) is a perspective view showing a state wherein the support member is assembled to the housing further.

As inferred from FIG. 3, the cavity portion 15 is a portion for allowing a base end side of the lid 2 to move out when the lid 2 turns from the closed state in FIGS. 2(a) and 2(b) to an open state. As shown in FIG. 7(a), in the cavity portion 16, on a bottom wall, there are respectively projected a push lifter 16a, and a projection 16b and a projection 16c dividing a predetermined gap therebetween. Incidentally, the push lifter 16a (the lifter is disclosed in, for example, Japanese Unexamined Patent Application Publication No. 2015-105062 and the like) allows the lid 2 to be pinched with one's fingers and the like by slightly pushing the lid 2 up further to rise when the lid 2 is opened. The symbol 16d represents a through hole located in an inner circumference of the cylindrical portion 10, and provided at a portion on a side lower than the cavity portion 15.

As shown in FIGS. 4(a), 4(b), and 4(e), each elastic locking claw 17 is divided and formed by an approximately U-shaped slit, and is projected by maintaining a predetermined gap between the elastic locking claw 17 and the flange portion 11. Then, as shown in FIGS. 2(a) and 2(b), when the lid device 7 is mounted on an attachment frame 9 fixed to an outer panel 8, each elastic locking claw 17 passes an opening portion 9a of the attachment frame 9 while elastically reducing a diameter, and simultaneously restores to its original state so as to allow the lid device 7 to be mounted relative to the attachment frame 9 in a state wherein an edge portion of the opening portion 9a is clamped between the edge portion of the opening portion 9a and the flange portion 11.

In other words, in the outer panel 8, there is provided an opening portion 8a having a size corresponding to the lid 2. The attachment frame 9 includes the opening portion 9a which allows the cylindrical portion 10 to pass through, and is located on an inner face of the outer panel 8, and connected to a peripheral edge portion of the opening portion 8a by welding and the like. Also, as shown in the enlarged view in FIG. 2(b), the lid device 7 is mounted on the attachment frame 9 in a state wherein the edge portion of the opening portion 9a is clamped between (the projection provided on a lower face of) the flange portion 11 and the locking claw 17.

The lock device 18 is formed by a known lock mechanism including a lock member 18a driven to protrude and recede. Then, the lock device 18 is located on the outer circumference of the cylindrical portion 10, and mounted on a lower side of the cavity portion 16 so as to switch the lid 2 to be locked in the closed state when the lock member 18a protrudes from the aforementioned through hole 16d, and the lid 2 to be in the open state when the lock member 18a recedes from the through hole 16d.

Figure 6A:
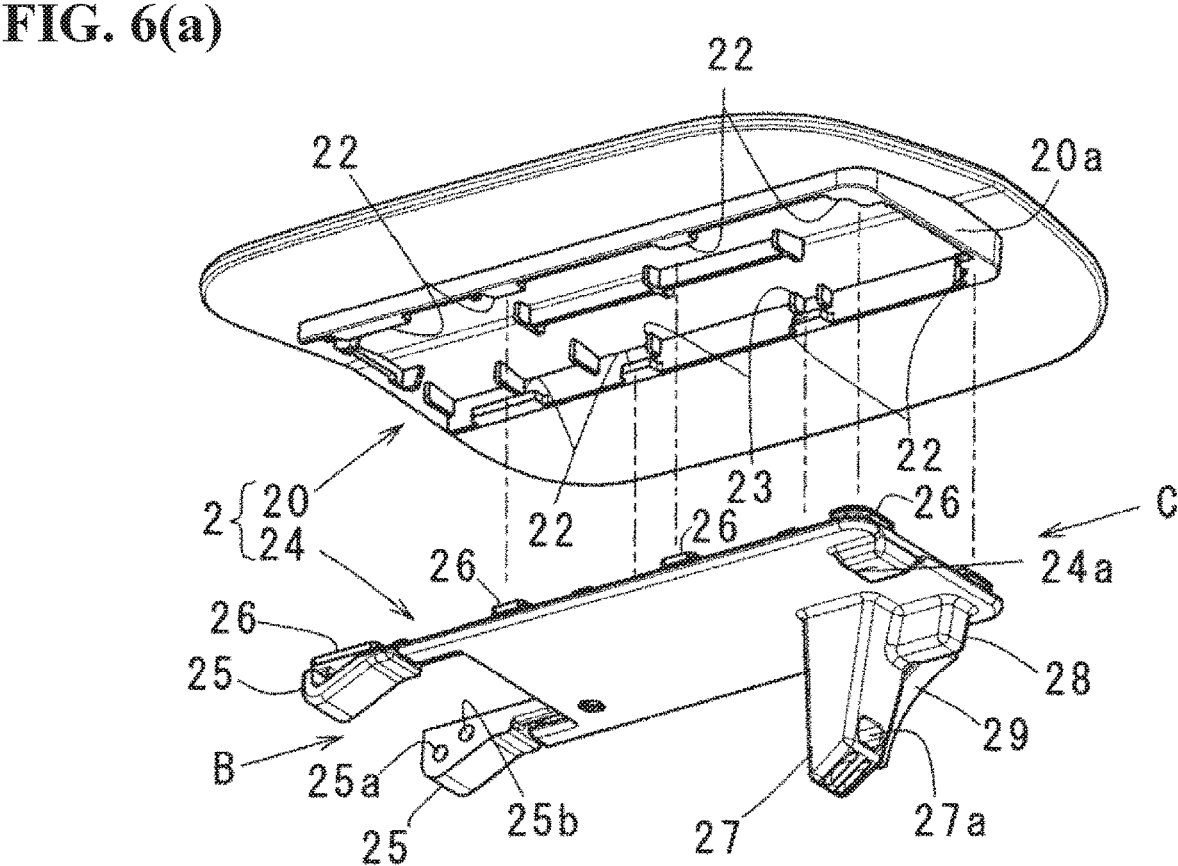
Figure 6B:
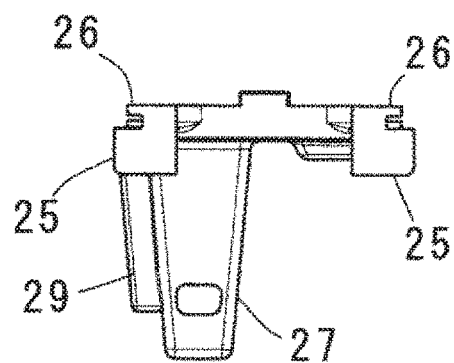
Figure 6C:
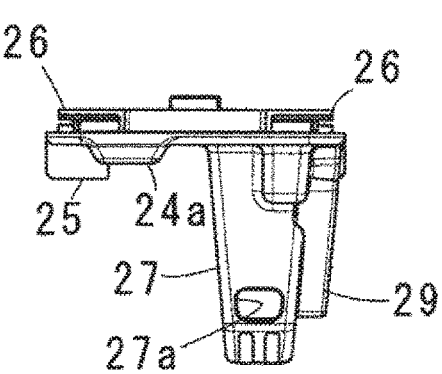

In the lid 2, as shown in FIG. 1(a), FIG. 5, and FIG. 6(a), the lid member 20 is formed by a rectangular shape which can be housed in the opening portion 8a of the outer panel 8 approximately without a gap. As shown in FIG. 6(a), on the reverse face of the lid member 20, there are included a frame portion 20a positioning the support member 24 on an inner side; a plurality of lower piece portions 22 projected on inner faces on both sides and front angle portions of the frame portion 20a; and a plurality of upper piece portions 23 forming a clamping portion between the upper piece portion 23 and the lower piece portion 22. In the support member 24, a back side is formed by a pair of arm portions 25. Each arm portion 25 is formed to become thicker up and down as moving to an end side from a middle in the front and back. On a facing inner face of each arm portion 25, there are provided a shaft hole 25a and a shaft hole 25b positioned in front and back on a coaxial line, respectively.

As shown in FIG. 5, on an upper face side of the support member 24, both sides and a front side in a longitudinal direction are formed in an L-shaped step, and the upper face side of the support member 24 includes a plurality of piece portions 26 protruding to a vertical face of the L shape and an upper side of the arm portion 25. As shown in FIG. 6(a), a lower face side of the support member 24 includes a pedestal portion 24a projected in a corner portion on one front side; an engagement piece 27 projected in an approximately middle of a plate width on a front side; a small projection 28 projected further forward from one portion of a front end face of the engagement piece 27; and a guide piece 29 projected on the other front side in a state connected to a corresponding side face of the engagement piece 27 and the small projection 28.

Among those, each piece portion 26 is assembled in such a way so as to be clamped between the aforementioned lower piece portion 22 and upper piece portion 23, so that the support member 24 is attached to the reverse face of the lid member 20. When the lid 2 is switched from the open state to the closed state, the pedestal portion 24a abuts against the aforementioned buffer projection 16a. The engagement piece 27 includes a locking hole 27a passing through back and forth, and the aforementioned lock member 18a is inserted and engaged so as to lock the lid 2 in the closed state. The small projection 28 fits into the gap between the aforementioned projections 16b and 16c in the closed state of the lid 2 so as to control an unintentional oscillation of the lid 2. The guide piece 29 slides along a curved surface formed in a border portion between the cavity portion 16 and the cylindrical portion 10 in a process wherein the lid 2 is switched from the open state to the closed state, and from the closed state to the open state so as to maintain smooth turning of the lid 2.

Figure 8B:
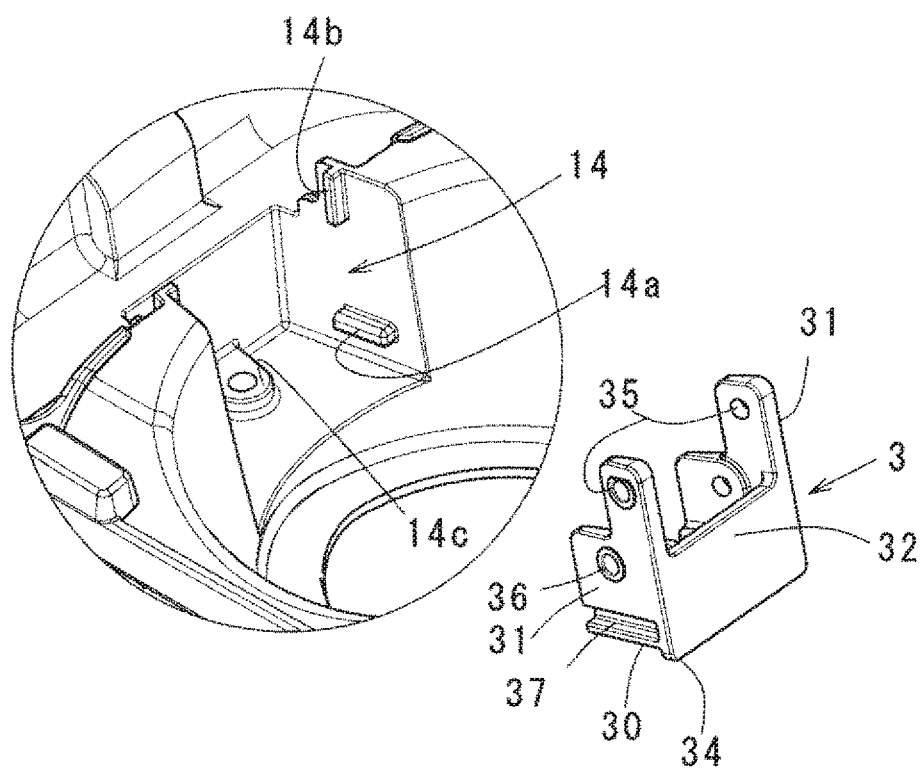
FIG. 8(b) is an enlarged view of a D portion in FIG. 8(a).

The base member 3 has a size which can be approximately housed in the concave portion 14 (see FIG. 8(b)). Also, as shown in FIG. 3, FIG. 5, and FIG. 8(b), the base member 3 includes a bottom wall 30; side walls 31 and 31 connected to both sides of the bottom wall 30 and forming an upper side thinner than a lower side; a back wall 32 connecting back end sides of both side walls 30 so as to make an inside of a concave portion difficult to be seen; a boss 33 (see FIG. 5) projected on an upper face of the bottom wall 30 and having a through hole in an up-and-down direction; a leg 34 integrated with the back wall 32 and protruding downwardly from the bottom wall 30; shaft holes 35 and 36 provided above and below both side walls 31 and respectively positioned on a coaxial line; and groove portions 37 which are engaged portions located on both side walls 31, provided on a side lower than the shaft hole 36, and horizontally extending from a front end to just before a back end.

The aforementioned base member 3 is pushed into the concave portion 14 such that the groove portions 37 on both sides fit into the projecting piece portions 14a. Then, the base member 3 is positioned in a state wherein the upper side formed thinner in each side wall 31 abuts against the control projection 14b, and the base member 3 is mounted on the concave portion 14 by an engagement of the projecting piece portion 14 and the groove portion 37. In this mounted state, in the base member 3, a front side of the bottom wall 30 is supported in the pedestal 14c, and a back side of the bottom wall 30 is supported on the bottom face of the concave portion 14 through the leg 34 so as to maintain a horizontal state. Also, as shown in FIG. 3, the through hole of the boss 33 communicates with the through hole of the pedestal 14c. Incidentally, in the structure, as necessary, it is designed such that a fastener such as a screw and the like is screwed into the through hole of the boss 33 from the through hole of the pedestal 14c from an outside or inside so that the base member 3 does not unintentionally come off from the concave portion 4. However, such a fastener can be omitted.

The first link member 4A and the second link member 4B support the lid 2 or the support member 24 to be turnable relative to the base member 3. Namely, as shown in FIG. 5, FIG. 9(a), and FIGS. 10(a) and 10(c), the first link member 4A includes a plate portion 40 having an approximately rectangular shape; upper protruding portions 41 and lower protruding portions 42 located on both upper sides and both lower sides of the plate portion 40, and projected upwardly or downwardly; shaft portions 43 and 43 protruding on a coaxial line on both outside faces of the upper protruding portions 41; and shaft portions 44 and 44 protruding on a coaxial line on both outside faces of the lower protruding portions 42. On upper and lower faces of the plate portion 40, there is provided a plurality of concaves or notch portions.

In the aforementioned link member 4A, the respective shaft portions 44 on the lower side are fitted and connected to the corresponding shaft holes 36 of the base member to be turnable, and the respective shaft portions 43 on the upper side are fitted and connected to the corresponding shaft holes 25a of the support member to be turnable.

Figure 9A:
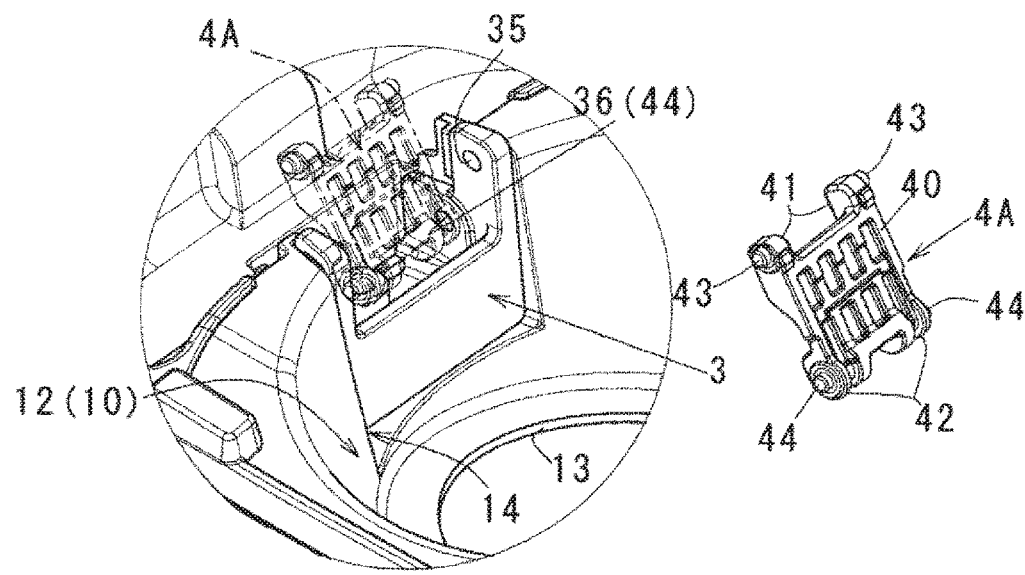
FIG. 9(a) is an assembly explanatory view of a first arm member relative to a base member mounted in a concave portion.
Figure 9B:
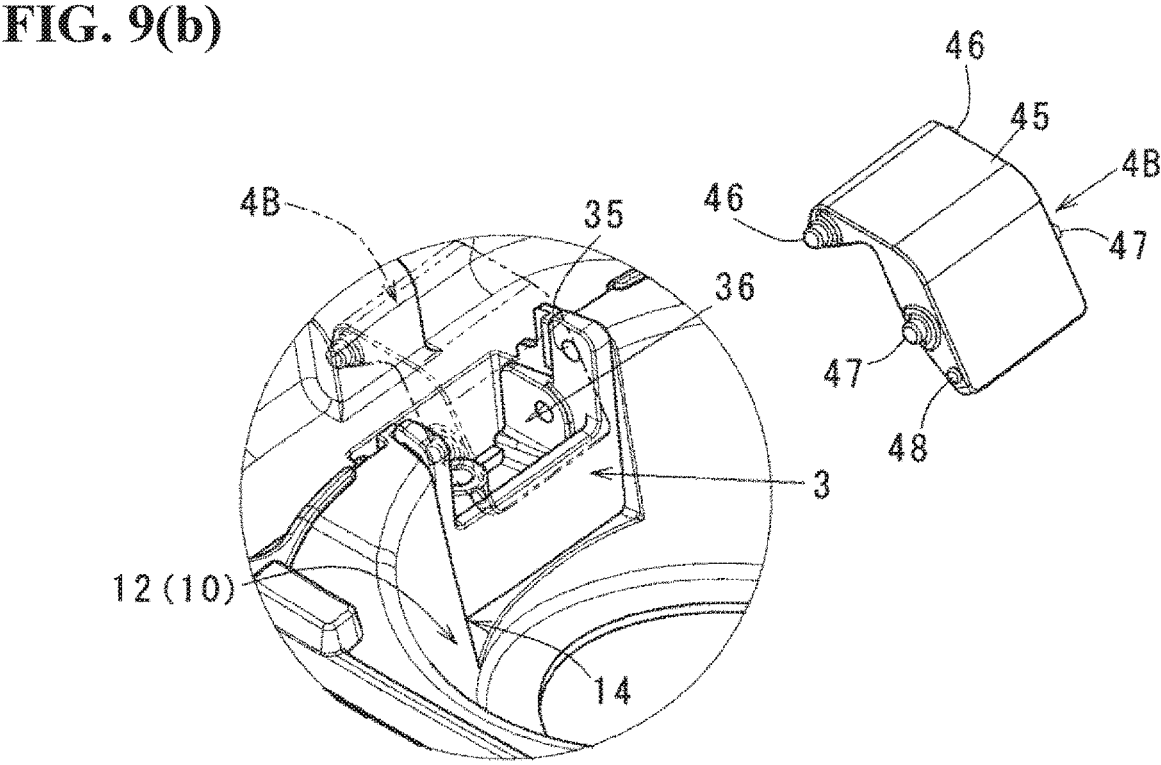
FIG. 9(b) is an assembly explanatory view of a second arm member relative to the base member of the concave portion, in the aforementioned enlarged view of the D portion.
Figure 10A:
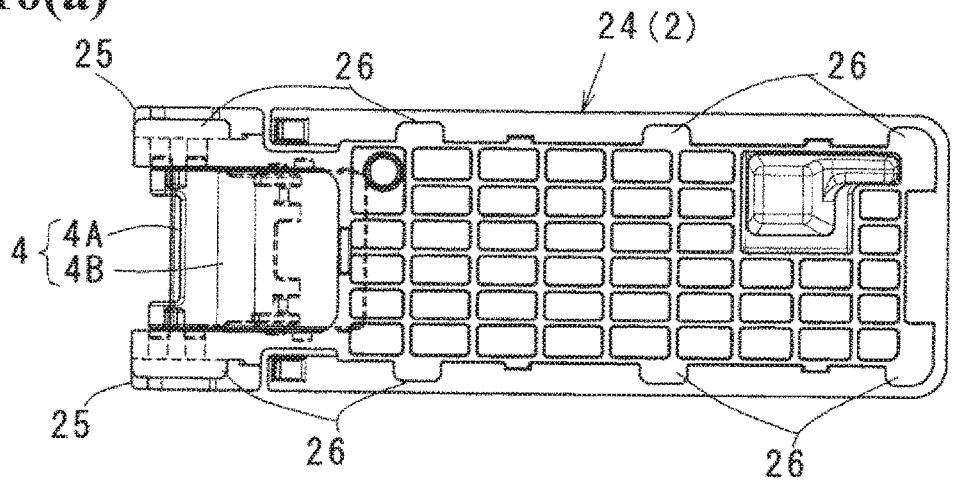
FIGS. 10(a), 10(b), and 10(c) are a top view, a side view, and a bottom view in a state wherein the first and second arm members are connected to the support member.
Figure 10B:
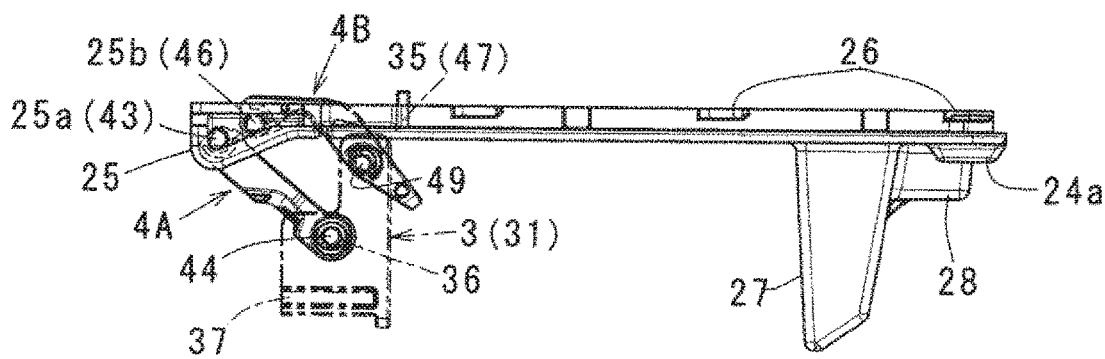
Figure 10C:
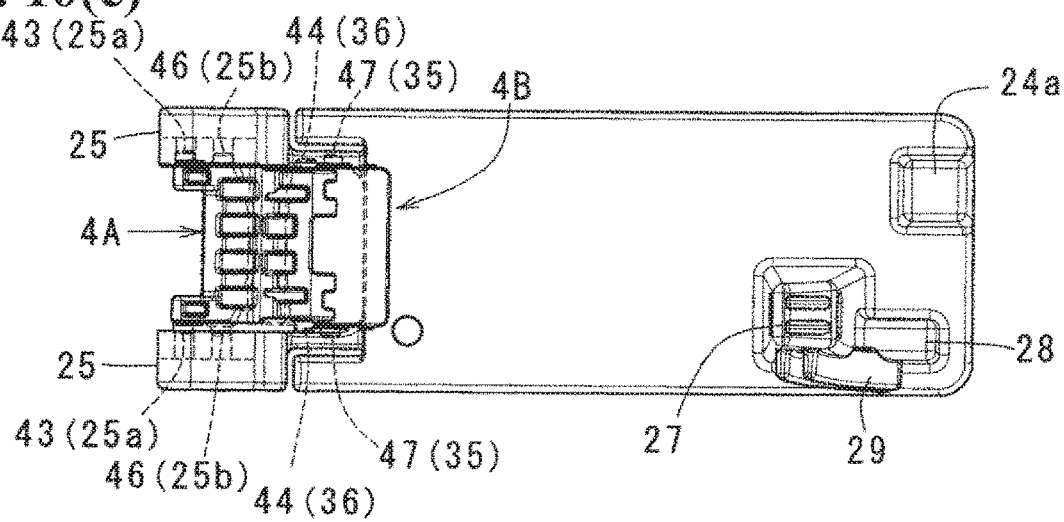
Figure 11A:
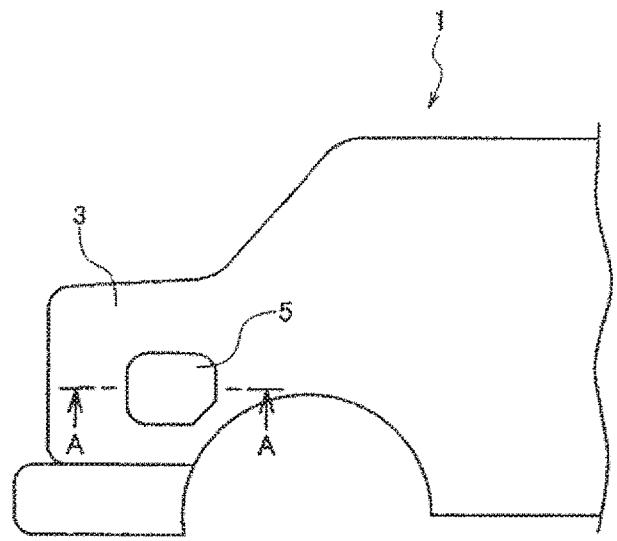
Figure 11B:
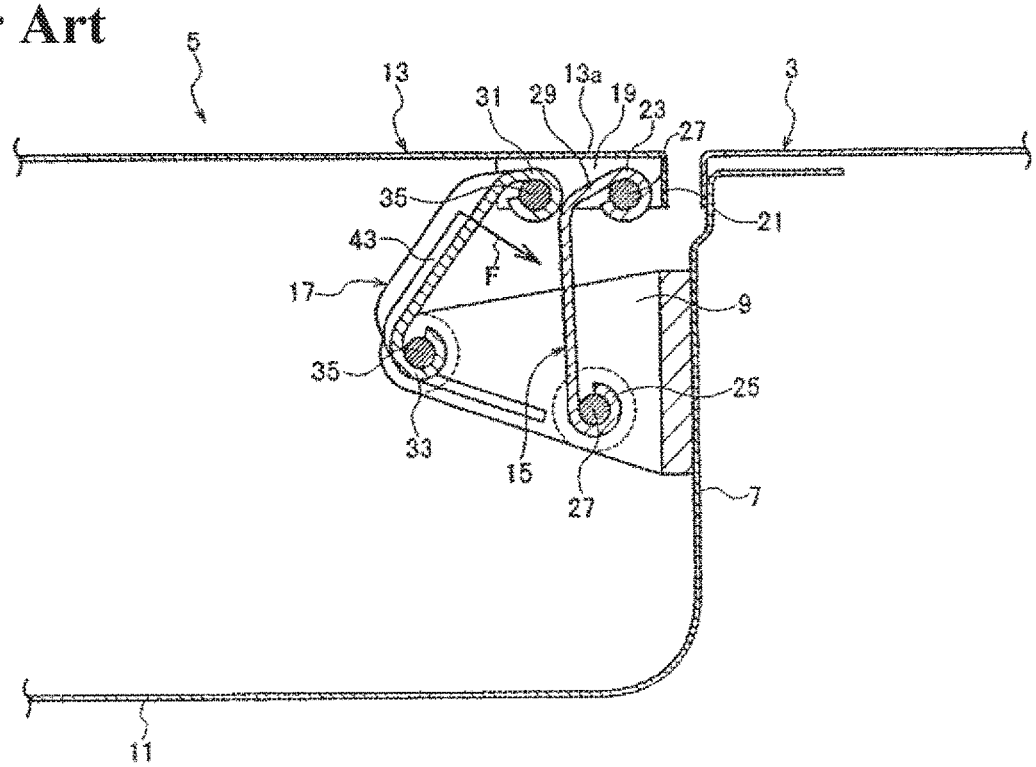

As shown in FIG. 5, FIG. 9(b), and FIG. 10(c), the second link member 4B includes a plate portion 45 having an approximately L shape in a side view; shaft portions 46 and 47 respectively projected on both upper sides and both lower sides of the plate portion 45 on a coaxial line; and projections 48 located further both sides lower than the shaft portions 47 and projected on a coaxial line. In a process wherein the link member 4B turns as a supporting point of the shaft portions 47 fitted to the shaft holes 35 of the base member 3 attached to the concave portion 14, for example, the projections 48 slidingly contact a facing portion of the base member 3 so as to reduce a frictional resistance or allow wobbling to be easily absorbed. Also, in the plate portion 45, as shown in FIG. 3, in the open state of the lid 2, an outer face disposed on a fuel filling aperture portion 12 side is formed on a flat surface (design surface), and in an inner face on an opposite side, a plurality of ribs is provided on an upper side, and a cavity is formed on a lower side. In the cavity, support shaft portions 49 for holding a spring are projected on both inside faces on a coaxial line.

In the aforementioned link member 4B, the respective shaft portions 47 on the lower side are fitted and connected to the corresponding shaft holes 35 of the base member to be turnable, and the respective shaft portions 46 on the upper side are fitted and connected to the corresponding shaft holes 25b of the support member to be turnable. At that time, a coil spring of the urging device 6 is assembled in a state of holding a coil portion in the support shaft portions 49 on both sides in the second link member, and one end 6a is disposed inside the cavity of the plate portion 45, and the other end 6b is disposed on the lower side of the first link member 4A.

(Operation) Next, the operation characteristics of the lid device 7 are clarified with reference to FIG. 1(a) to FIG. 3. (1) First, FIG. 2(a) shows an attaching operation wherein the lid device 7 assembled in the aforementioned manner is fixed to the attachment frame 9 mounted on the outer panel 8. In the structure, the lid device 7 includes the lock device 18 around the cylindrical portion 10, however, the lock device 18 is disposed on an inner side than the flange portion 11. Thus, as for the lid device 7 or the housing 1, a portion protruding outwardly from a circumference is eliminated as much as possible, so that when inserted into an opening portion (the opening portion 8a of the outer panel, and the opening portion 9 of the attachment frame) of a car body, the lid device 7 or the housing 1 can be straightly inserted, thereby solving a possibility such that the seal member 9 mounted on the flange portion 11 may be twisted or displaced accompanied by the insertion as in a conventional seal member, and improving an operation efficiency and a quality.

(2) Also, when the lid device 7 is inserted into the opening portion 9a and pressed, each locking claw 17 passes through the opening portion 9a accompanied by a displacement in a diameter-reduction direction, and simultaneously restores to its original state so as to clamp the edge portion of the opening portion 9a between the edge portion of the opening portion 9a and (the projection provided on the lower face of) the flange portion 11. Namely, in the attaching structure, the lid device 7 can be attached by one-touch operation. Also, in an attached state of the lid device 7, as shown in the enlarged view in FIG. 2(b), the seal member 19 is pressed against a corresponding portion of the attachment frame 9, and maintains water-tightness of the opening portion 9a.

(3) FIG. 2(b) and FIG. 3 show the lid device 7 in a condition mounted on a car body side. The lid device 7 is locked by the lock device 18 in the closed state of the lid 2, and as in a conventional manner, the lid device 7 closes the fuel filling aperture portion 12, and is disposed on the same face as the outer panel 8. When the lock device 18 is unlocked, the lid 2 is pressed in the opening direction against the urging force of the urging device 6 by the push lifer 6a so as to slightly open. From that state, when an operator turns the lid 2 in the opening direction by hand, in the middle (an intermediate position) of turning the lid 2, the urging direction of the urging device 6 is reversed, and after that (the intermediate position), the lid 2 turns in the opening direction through the link member 4 (first and second link members 4A and 4B) by the urging force of the urging device 6 until the lid 2 fully opens.

Operations of both link members 4A and 4B are similar to two link members of Patent Document 1, and for an opening and closing track of the lid 2, an original opening and closing track by the first link member 4A is controlled or supported by the second link member 4B, so that the opening and closing track of the lid 2 is corrected to be compact so as to prevent the lid 2 from interfering with the outer panel 8 at an opening and closing time. Consequently, in the structure, even if the respective shaft portions 43, 44, 46, and 47 of the link members 4A and 4B are disposed inside the housing 1, the lid 2 does not interfere with the outer panel 8.

(4) Also, in the structure, in an open state wherein the lid 2 opens in full lines in FIG. 3 through the link member 4 (first and second link members 4A and 4B), i.e., fully opens, the upper side of the first link member 4A abuts against the inside of the L shape of the plate member 45 of the second link member 4B, and an edge portion on the base end side of the lid 2 abuts against the plate portion 40 of the first link member 4A. Thereby, the lid 2 is stably held in an open state wherein the lid 2 opens at 90 degrees or more. Also, the structure excels in the appearance because in the open state in FIG. 3, the first link member 4A is in a state clamped between the lid 2 and the second link member 4B so as to be difficult to be seen; the second link member 4B includes the aforementioned flat design surface on the fuel filling aperture portion 12 side; the design surface becomes approximately the same surface (continuous surface) as the back wall 32 of the base member 3 integrally assembled with the housing 1, and a corresponding portion of the lid 2; and the like.

(5) Incidentally, the urging device 6 allows the lid 2 to turn from a middle position in the aforementioned opening direction to a fully open position by the urging force through the link member 4. Also, when the lid 2 is operated to turn to the middle position against the urging force from the fully open position, the lid 2 reverses, and after that, the lid 2 is switched to the closed state by the urging force through the link member 4. Such an urging structure improves opening and closing operations of the lid 2, and can absorb wobbling by vibrations in the closed state and the open state.

(6) Incidentally, in the aforementioned lid device 7, main structural members, i.e., the housing 1, the lid 2 (the lid member 20 and the support member 24), the base member 3, the link member 4 (the first link member 4A and the second link member 4B), and the cylindrical member 5 are made of resin so as to excel in mass productivity and easily provide a lightweight device.

As described above, the lid device of the present invention can be variously modified except for specified requirements within a range described in the invention. For example, as for the lid 2, the support member 24 is mounted on the lid member 20; however, a portion corresponding to the support member 24 may be integrally formed in the lid member 20. Also, as for the seal member 19, a separately formed member is attached to the flange portion 11 of the housing; however, the seal member may be integrally formed in the flange portion 11 by two-color formation. Also, the engaging portion (the projecting piece portion 14a) can be provided on a base member side, and the engaged portion (the groove portion 37) can be provided on a concave portion 14 side as well.

EXPLANATION OF SYMBOLS

1 . . . a housing (10 is a cylindrical portion, and 11 is a flange portion)
2 . . . a lid (20 is a lid member, and 24 is a support member)
3 . . . a base member (30 is a bottom wall, 31 is side walls, and 32 is a back wall)
4 . . . a link member (4A is a first link member, and 4B is a second link member)
5 . . . a cylindrical member
6 . . . an urging device (6a is one end, and 6b is the other end)
7 . . . a lid device
8 . . . an outer panel (8a is an opening portion)
9 . . . an attachment frame (9a is an opening portion)
12 . . . a fuel filling aperture portion
14 . . . a concave portion (14b is control projections)
14a . . . projecting piece portions (engaging portions)
19 . . . a seal member
35 . . . shaft holes
36 . . . shaft holes
37 . . . groove portions (engaged portions)
43 . . . shaft portions
44 . . . shaft portions
46 . . . shaft portions
47 . . . shaft portions
48 . . . projections
49 . . . support shaft portions Incidentally, all contents of the specification, claims, drawings, and abstract of Japanese Patent Applications No. 2015-174030 filed on Sep. 3, 2015 are cited in their entireties herein and are incorporated as a disclosure of the specification of the present invention.

What is claimed is:

1. A vehicle lid device, comprising:
a housing having a container-like shape and opening upwardly;
a lid opening and closing an opening of the housing;
a link member connecting the lid to the housing to be openable and closable;
a base member pivotally supporting the link member turnably, and a concave portion provided in the housing and capable of receiving the base member, wherein an engaging portion is formed in either the base member or the concave portion, and an engaged portion engaging the engaging portion is formed in the other of the base member or the concave portion, and the base member is mounted relative to the concave portion through an engagement of the engaging portion and the engaged portion, and wherein a base end of the link member is connected to the base member to be turnable through a shaft portion, and a shaft end of the shaft portion is shielded by an inner wall face of the concave portion.

2. A vehicle lid device according to claim 1, wherein the engaging portion and the engaged portion are formed by a projecting piece portion and a groove portion which can engage with each other.

3. A vehicle lid device according to claim 1, wherein the link member is formed by a first link member and a second link member, and an urging device is disposed between the first link member and the second link member.

4. A vehicle lid device, comprising:
a housing having a container-like shape and opening upwardly;
a lid opening and closing an opening of the housing;
a link member connecting the lid to the housing to be openable and closable;
a base member pivotally supporting the link member turnably, and
a concave portion provided in the housing and capable of receiving the base member,
wherein an engaging portion is formed in either the base member or the concave portion, and an engaged portion engaging the engaging portion is formed in the other of the base member or the concave portion, and the base member is mounted relative to the concave portion through an engagement of the engaging portion and the engaged portion,
wherein the link member is formed by a first link member and a second link member, and an urging device is disposed between the first link member and the second link member, and
wherein when the lid opens, an outer face of one of the link members substantially flush with a corresponding portion of the housing.

5. A vehicle lid device according to claim 1, wherein the housing, the lid, the link member, and the base member are formed by a resin molded article.

* * * * *